United States Patent
Carbune et al.

(10) Patent No.: US 12,306,891 B2
(45) Date of Patent: May 20, 2025

(54) INTEGRATION OF WEB AND MEDIA SNIPPETS INTO MAP APPLICATIONS

(71) Applicant: Google LLC, Mountain View, CA (US)

(72) Inventors: Victor Carbune, Zurich (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/418,594

(22) Filed: Jan. 22, 2024

(65) Prior Publication Data

US 2024/0160680 A1    May 16, 2024

Related U.S. Application Data

(63) Continuation of application No. 17/252,439, filed as application No. PCT/US2020/049042 on Sep. 2, 2020, now Pat. No. 11,914,661.

(51) Int. Cl.
| | |
|---|---|
| *G06F 16/9537* | (2019.01) |
| *G01C 21/34* | (2006.01) |
| *G01C 21/36* | (2006.01) |
| *G06F 16/29* | (2019.01) |
| *G06F 16/9538* | (2019.01) |
| *G06F 40/103* | (2020.01) |
| *G06T 11/60* | (2006.01) |

(52) U.S. Cl.
CPC ..... *G06F 16/9537* (2019.01); *G01C 21/3476* (2013.01); *G01C 21/3626* (2013.01); *G06F 16/29* (2019.01); *G06F 16/9538* (2019.01); *G06F 40/103* (2020.01); *G06T 11/60* (2013.01)

(58) Field of Classification Search
CPC .. G06F 16/9537; G06F 16/9538; G06F 16/29; G06F 40/103; G01C 21/3476; G01C 21/3626; G06T 11/60
See application file for complete search history.

(56) References Cited

U.S. PATENT DOCUMENTS

| | | | |
|---|---|---|---|
| 6,311,194 B1 | 10/2001 | Sheth et al. | |
| 7,315,848 B2 * | 1/2008 | Pearse | G06F 16/9566 707/E17.115 |
| 7,587,387 B2 * | 9/2009 | Hogue | G06F 16/951 707/999.005 |
| 8,527,496 B2 * | 9/2013 | Wable | G06F 16/24554 707/711 |
| 8,612,416 B2 | 12/2013 | Kumar et al. | |

(Continued)

OTHER PUBLICATIONS

International Search Report and Written Opinion for International Application No. PCT/US2020/049042 dated Jan. 20, 2021. 12 pages.

(Continued)

*Primary Examiner* — Gertrude Arthur Jeanglaude
(74) *Attorney, Agent, or Firm* — Lerner David LLP (57) ABSTRACT

The technology relates to integrating web content into a map application. A query is sent from the map application. At least one snippet of web content identified as relevant to the query is received in response to the query, the at least one snippet of content including a portion of media or textual content from a source on the web. The portion of media or textual content is formatted for display in the map application and output for display in the map application.

20 Claims, 5 Drawing Sheets

(56) References Cited

U.S. PATENT DOCUMENTS

| | | | |
|---|---|---|---|
| 8,620,951 B1* | 12/2013 | He | G06F 16/24578 |
| | | | 707/769 |
| 8,635,243 B2 | 1/2014 | Phillips et al. | |
| 8,949,266 B2 | 2/2015 | Phillips et al. | |
| 9,697,230 B2* | 7/2017 | Houh | G06F 16/78 |
| 9,817,911 B2 | 11/2017 | De Francisci Morales et al. | |
| 10,066,948 B2* | 9/2018 | Setlur | G01C 21/34 |
| 2002/0126990 A1* | 9/2002 | Rasmussen | H04N 21/4622 |
| | | | 348/E7.071 |
| 2008/0010605 A1 | 1/2008 | Frank | |
| 2008/0086356 A1* | 4/2008 | Glassman | G06Q 30/0242 |
| | | | 705/14.41 |
| 2012/0202525 A1 | 8/2012 | Pettini | |
| 2014/0359537 A1 | 12/2014 | Jackobson et al. | |
| 2018/0356243 A1 | 12/2018 | Mehta et al. | |

OTHER PUBLICATIONS

International Preliminary Report on Patentability for International Application No. PCT/US2020/049042 dated Mar. 16, 2023. 7 pages.

* cited by examiner

INTEGRATION OF WEB AND MEDIA SNIPPETS INTO MAP APPLICATIONS

CROSS REFERENCE TO RELATED APPLICATIONS

The present application is a continuation of U.S. patent application Ser. No. 17/252,439 filed Dec. 15, 2020 and issued as U.S. Pat. No. 11,914,661, which claims the benefit of the filing date of U.S. Patent Application No. PCT/US2020/049042 filed on Sep. 2, 2020, the disclosures of which are hereby incorporated herein by reference.

BACKGROUND

Map applications have historically provided representations of geographic areas and directions between locations. Modern map applications provide additional information and services beyond those historically provided, such as satellite imagery, street view images, virtual tours of locations, three-dimensional models of locations, and real-time traffic conditions.

SUMMARY

Aspects of this disclosure provide integration of web content into a map application. One aspect of the disclosure is directed to a method for integrating web content into a map application. The method includes sending, by one or more processors, a query from the map application; receiving, by the one or more processors, in response to the query, at least one snippet of web content identified as relevant to the query, the at least one snippet of content including a portion of media or textual content from a source on the web; formatting, by the one or more processors, the portion of media or textual content for display in the map application; and outputting, by the one or more processors, the at least one portion of media or textual content for display in the map application.

Another aspect of the disclosure is directed to a system comprising one or more processors. The one or more processors are configured to send a query from a map application; receive, in response to the query, at least one snippet of web content identified as relevant to the query, the at least one snippet of content including a portion of media or textual content from a source on the web; format the portion of media or textual content for display in the map application; and output the at least one portion of media or textual content for display in the map application.

Another aspect of the disclosure is directed to a non-transitory computer-readable storage medium storing instructions executable by one or more processors for performing a method, comprising: sending a query from the map application; receiving, in response to the query, at least one snippet of web content identified as relevant to the query, the at least one snippet of content including a portion of media or textual content from a source on the web; formatting the portion of media or textual content for display in the map application; and outputting the at least one portion of media or textual content for display in the map application.

In some instances, the query includes a request for directions to a location, and the at least one snippet of content includes directions to the location provided by a website associated with the location.

In some instances, the query includes a request for directions to a location, and the at least one snippet of content includes information about a route and/or points of interest along a route to the location.

In some instances, the query includes a location of a user device. In some examples, the at least one snippet of content includes information about a route and/or points of interest near the location of the user.

In some instances, formatting the at least one snippet of content in the map application includes formatting the at least one snippet of content based on an interface of the map application.

In some instances, the at least one snippet of content is audio or video content.

In some instances, outputting the at least one portion of media or textual content includes outputting a citation of where the at least one relevant snippet of content is located.

Another aspect of the disclosure is directed to a method for providing web content. The method comprising annotating, by one or more processors using an entity annotation model, a piece of web content with one or more annotations of known geographic entities within the piece of web content; segmenting, by the one or more processors using a segmentation model, the annotated web content into a set of snippets, with each snippet in the set of snippets corresponding to a classification including a route, a segment of a route, or a place of interest (POI) based on the annotations; indexing, by the one or more processors, each snippet in the set of snippets into a database, the indexing being based on the classification of the respective snippet; retrieving, by the one or more processors, in response to a query from a user device, one or more indexed snippets from the database; and providing, by the one or more processors, the one or more indexed snippets to the user device.

Another aspect of the disclosure is directed to a system comprising one or more processors. The one or more processors are configured to annotate, using an entity annotation model, a piece of web content with one or more annotations of known geographic entities within the piece of web content; segment, using a segmentation model, the annotated web content into a set of snippets, with each snippet in the set of snippets corresponding to a classification including a route, a segment of a route, or a place of interest (POI) based on the annotations; index each snippet in the set of snippets into a database, the indexing being based on the classification of the respective snippet; retrieve, in response to a query from a user device, one or more indexed snippets from the database; and provide the one or more indexed snippets to the user device.

Another aspect of the disclosure is directed to a non-transitory computer-readable storage medium storing instructions executable by one or more processors for performing a method, comprising: annotating, using an entity annotation model, a piece of web content with one or more annotations of known geographic entities within the piece of web content; segmenting, using a segmentation model, the annotated web content into a set of snippets, with each snippet in the set of snippets corresponding to a classification including a route, a segment of a route, or a place of interest (POI) based on the annotations; indexing each snippet in the set of snippets into a database, the indexing being based on the classification of the respective snippet; retrieving, in response to a query from a user device, one or more indexed snippets from the database; and providing the one or more indexed snippets to the user device.

In some instances, the piece of web content is collected from the web. In some examples, the piece of web content is determined to be multimedia content; and before annotating the piece of web content, a text-based record of the multimedia content is generated, wherein the text-based record of the multimedia content is annotated.

In some instances, indexing includes storing each snippet in the set of snippets in the database in association with one or more attributes. In some examples, each of the indexed snippets may be ranked based on its associated one or more attributes. In some examples, retrieving the one or more indexed snippets includes determining the indexed snippets with the highest ranking; and selecting the indexed snippets with the highest ranking as the one or more indexed snippets.

DETAILED DESCRIPTION

Overview

The technology relates to integrating content from sources across the web into a map application. In this regard, web content may be indexed according to whether it is directed to a route or a point of interest. When a query is made in the map application, the index may be searched to determine whether relevant content is contained therein. In the event relevant content is found, the map application may integrate the relevant content into the information output to the user in response to the query. For example, indexed web content may include a blog post authored by a traveler who made a trip along route 66. In response to a query indicating a user of the map application is navigating along route 66 on a vacation, navigation instructions may be presented to the user along with relevant content from the indexed blog post. In another example, a query may be received by the map application indicating a user is planning to travel to a theme park. In response to this query, the official directions provided by the theme park's website, which have been previously indexed, may be presented to the user. Other example use cases are discussed herein.

Example Systems

Figure 1:
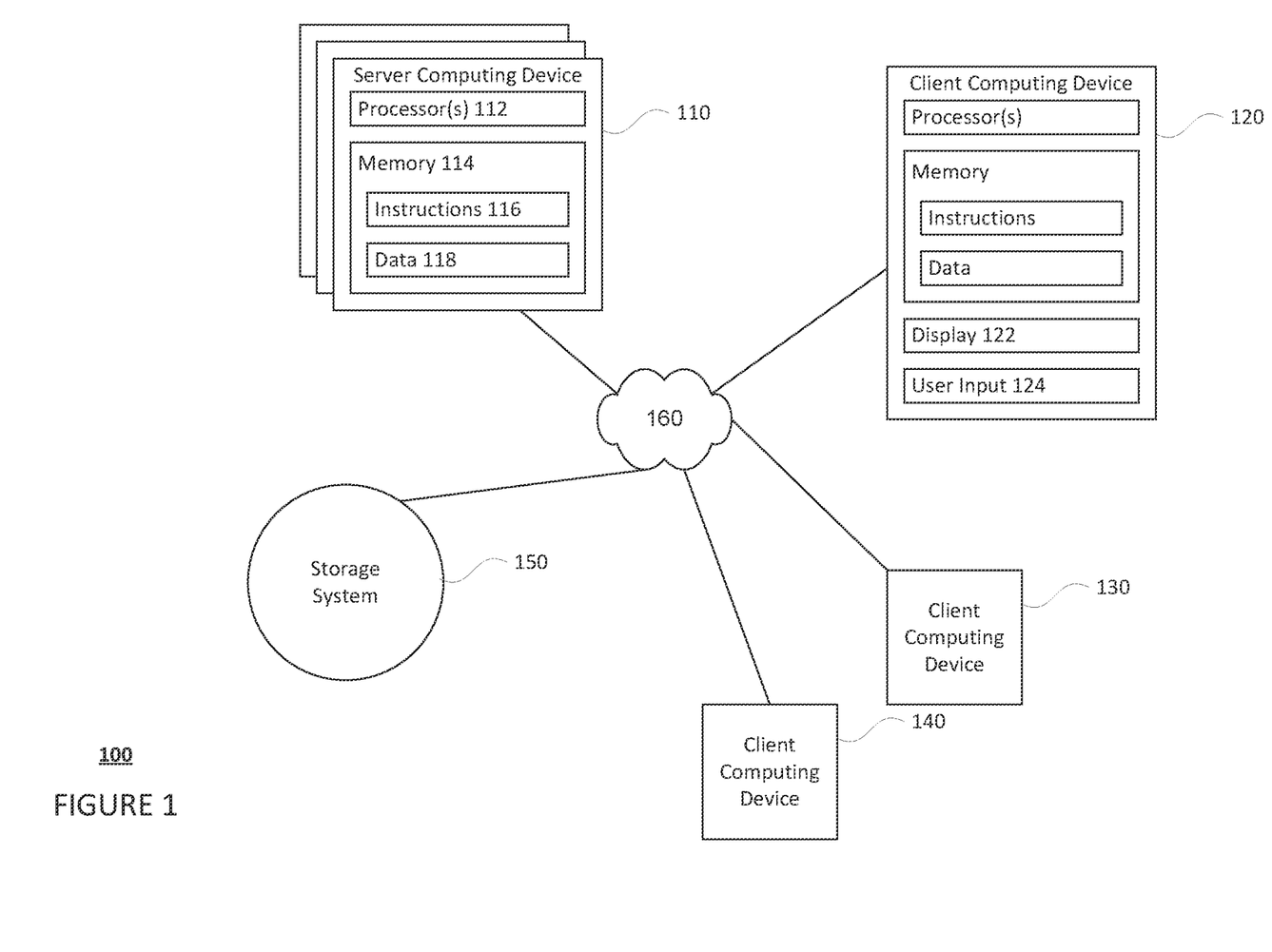
FIG. 1 is a functional diagram of an example system in accordance with aspects of the disclosure.
Figure 2:
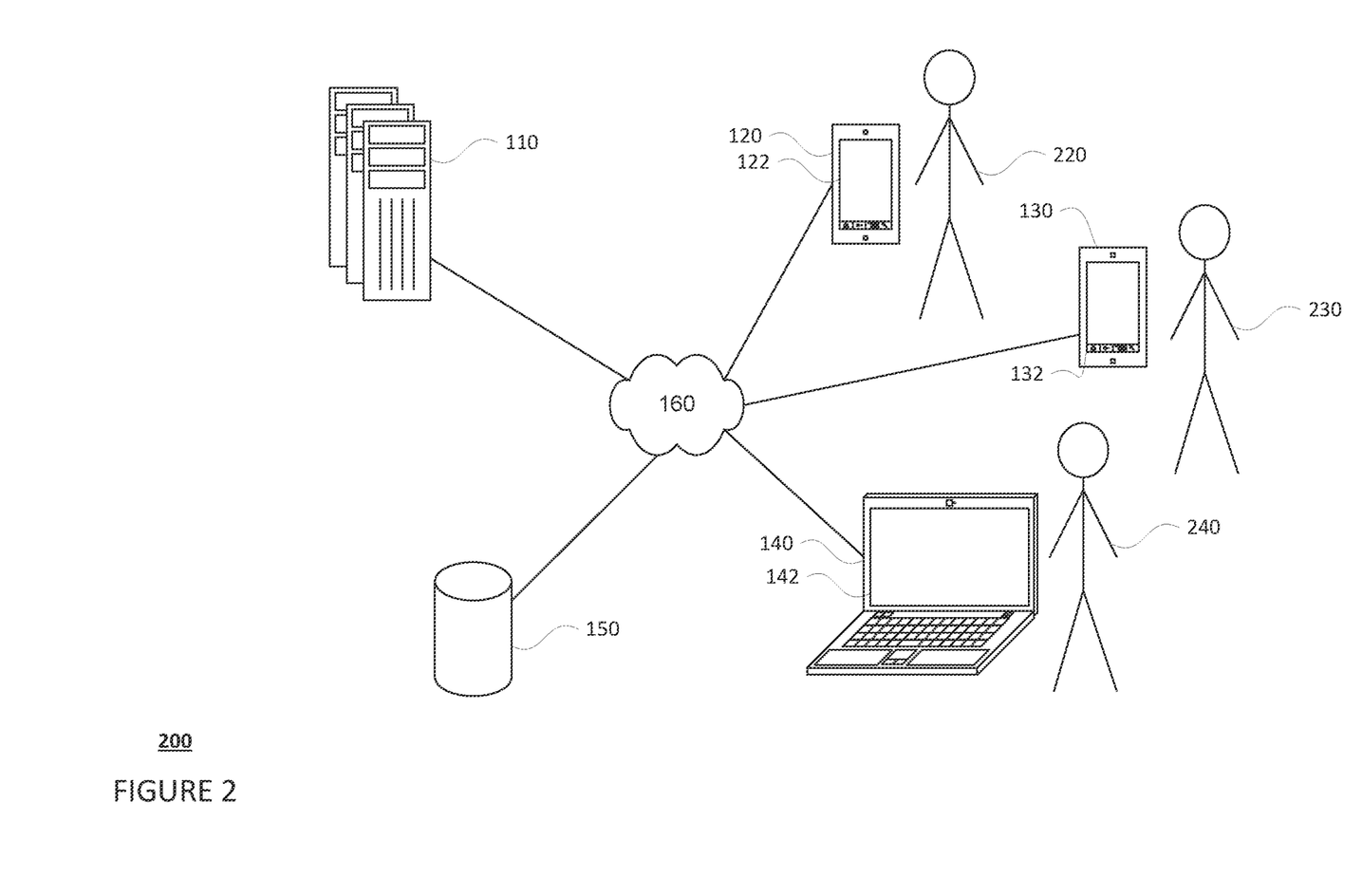
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160.

The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130, or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen, or microphone). The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with servers over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown). Storage system 150 may store web content and/or an inverse index database, as described herein.

Example Methods

Figure 3:
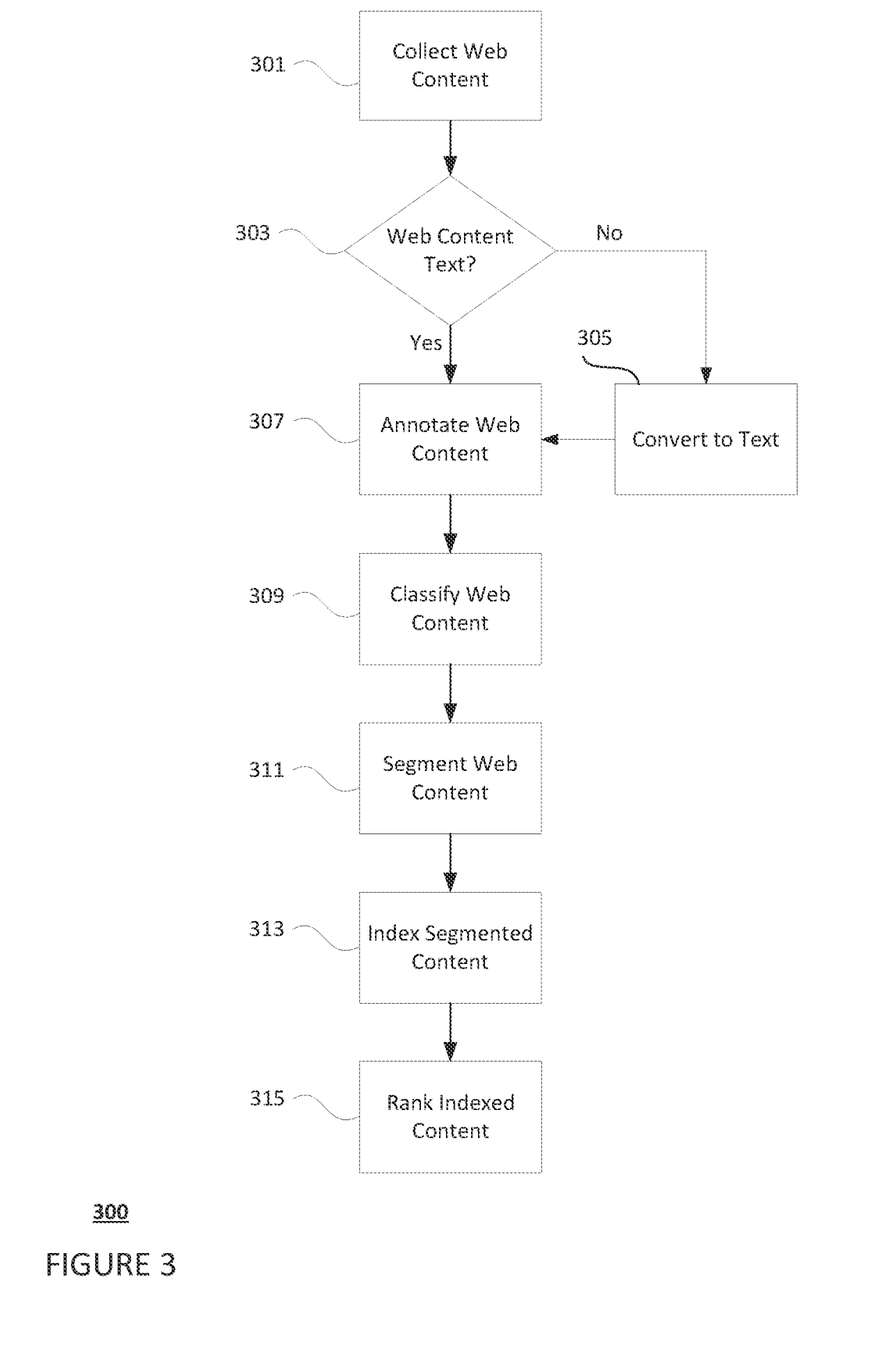
FIG. 3 is a flow diagram of collecting and indexing snippets of web content in accordance with aspects of the disclosure.

The flow diagram of FIG. 3 illustrates a process for gathering and indexing web content by a server computing device, such as server computing device 110, to provide to users in response to queries submitted to a map application. In this regard, web content may be gathered from sources on the web, as shown in block 301. Any non-textual web content, such as audio or video, may be identified, as shown in block 303, and converted to text for further processing, as shown in block 305. The web content may be processed using an annotation model that annotates the web content with information about geographic entities, such as locations and points of interest, that are discussed in the web content, as shown in block 307. The annotated web content may then be processed using a document-level content classification model that classifies the web content according to the topic or topics covered within the web content, as shown in block 309. Such classification can reduce the processing requirements to identify relevant content. The entirety of the web content may be segmented into snippets, with each snippet being labeled as either corresponding to a POI or route based on the annotations, as shown in block 311. The snippets may then be indexed, as shown in block 313, and ranked to allow for future retrieval of relevant web content, as shown in block 315. Segmenting the content into snippets can reduce the processing requirements because only relevant segments need be processed at a later stage. In addition, less data needs to be transmitted to a user device, so bandwidth requirements are reduced. Furthermore, the data that is then stored at and processed by the user device is reduced.

The web content that is collected can include any type of content available on the internet or other networked location and not produced or formatted specifically for a mapping application. For instance, the content may include textual content, such as webpages and documents, or media content, such as audio (e.g., podcasts or mp3s), videos, and other such multimedia. Although the web content can be collected from any source accessible on the web, the sources of web content may be limited to sources known to contain information relevant to travel and navigation. For instance, the sources may include travel blogs, websites of popular destinations and landmarks, multimedia hosting services such as video services, podcast services, and audio services, etc. In some instances, the web content may be limited to trusted sources, sources identified as having relevant data, such as based on search logs for topics relevant to travel and navigation, etc.

The collection of web content, as shown in block 301 in FIG. 3, may be done automatically or manually. For instance, a user may navigate a computing device, such as one of computing devices 120-140, to a blog and download content from the blog for further processing. Alternatively, or in combination with the manual collection of web content, automatic collection of web content may be performed, such as by a web crawler installed on server computing device 110. In some instances, the creators or owners of web content may provide copies of the web content for further processing. Permission to retrieve web content, manually or automatically, may be provided by the owners or handlers of the web content prior to retrieval of the web content.

Web content may be filtered to identify textual content and media content. In this regard, the server computing device 110 may identify media content and process the media content through a speech recognition engine to generate a text-based record of the media content, as shown in block 305 of FIG. 3. The text-based record may form a transcript of the audio included in the media content. By filtering to identify textual and media content, the data stored in memory can be reduced. In addition, future processing can be reduced due to only relevant data being stored.

A sound recognition model may be used to classify background and other such noises in text form. For instance, an audio file, which can be considered media content, may include bird noises. The bird noises may be identified by the sound recognition model and entered into the text-based record. For instance, the bird noises may be shown in the text-based record as "<bird_sound>".

An image recognition model may be used to classify the contents of images, videos, or other such media content with visual. For instance, the media content may include a video with corresponding audio. The speech recognition model may make a transcript of the audio and the image recognition model may incorporate descriptions of the video into the transcript. For instance, a first image in the media content may be a car and a second image a train. The imaging model may identify the car and train and insert a description of such in the text-based record at the time they are shown. Although the speech recognition model, sound recognition model, and image recognition model have been described as separate models, the functions of some or all of the speech recognition model, sound recognition model, and image recognition model may be included in a single model. Storing such simplified representations of the content, e.g. short transcripts of a video rather than the whole video, can enable faster and more efficient future processing when a search for relevant content is carried out.

The textual content, including the text-based records of the media content, may be annotated, as shown in block 307 of FIG. 3. Each piece of textual content, including the text-based records, may be further classified to determine if it relates to a route or a POI, as shown in block 309. A point of interest can include a street, address, and location/place.

Figure 4:
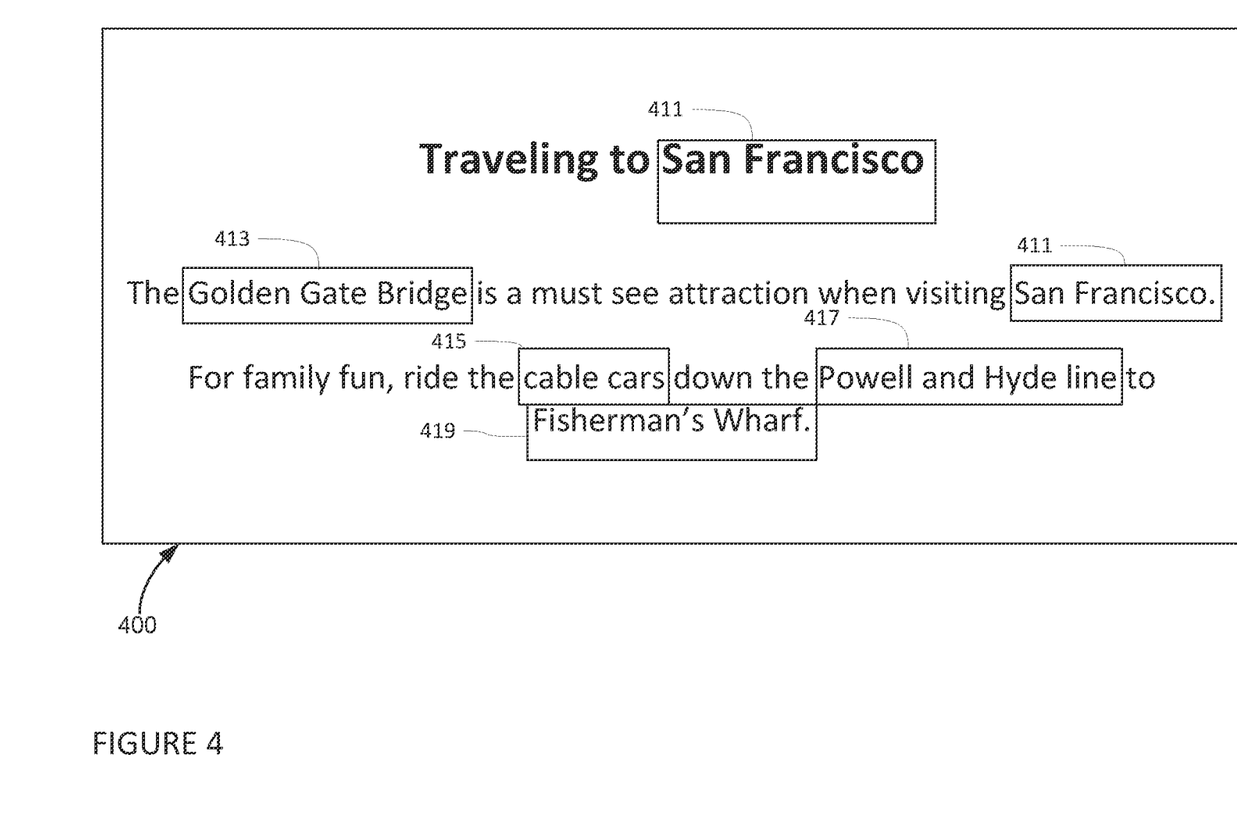
FIG. 4 is an example web content of a website in accordance with aspects of the disclosure.

Annotation of the textual content may be conducted using one or more entity annotation models. The entity annotation models may be any kind of machine learned, grammar, heuristic, or statistical model capable of associating text of the textual content with annotations that are indicative of the points of interest described in the textual content. For instance, an entity annotation model may map portions of the unstructured text of the textual content to known geographic entities stored in a known knowledge base of geographic entities. FIG. 4 shows example textual content of a webpage 400 and corresponding annotations applied by an annotation model. In this regard, the "Golden Gate Bridge," (413) "San Francisco," (411) "cable cars," (415) "Powell and Hyde line" (417) and "Fisherman's Wharf" (419) are identified and annotated as known POIs.

In some instances, the textual content may be annotated using part-of-speech tagging and/or semantic annotation models capable of determining relevant content, such as verbs indicating actions, nouns such as geographic entities, etc. These part-of-speech and/or semantic annotation models may then annotate the textual content with annotations that describe activities that can be performed there. For example, referring to the textual content of FIG. 4, textual content containing the phrase "For family fun, ride the cable cars down the Powell and Hyde line to Fisherman's Wharf," may be annotated by the part-of-speech and/or semantic annotation models with an annotation that cable cars can be rode in San Francisco. In some instances, the entity annotation models may include models that detect addresses of entities based on the structure of the textual content, without the need for the entities or addresses to be found in a known knowledge base.

Once annotated, a document-level content classification model classifies the overall topic of the textual content, as shown in block 309 of FIG. 3. In this regard, the document-level content classification provides an overall descriptive summary of the content. This overall descriptive summary of the content can be rendered or displayed when a snippet is rendered or displayed, as described herein. The content classification model may be a deep neural network (DNN), Conditional Random Fields, Hidden Markov Models, or other machine learning models may be trained on web documents and media content, which may be labeled.

The content classification model may receive as inputs the annotations, the textual content or media content, and the structure of the textual content or media content. Based on the inputs, the content classification model may classify the overall topic of the web content. Example classification of the overall topic of the web content may include navigation instructions, tips relating to a particular route, information about a particular POI, etc. Referring to the textual content of the webpage in FIG. 4, the classification may be "information related to San Francisco," or something similar Such classification reduces the processing required to search for such information and identify it as being of interest to the user.

The web content is segmented into snippets, each of which corresponds to a route or a POI, as shown in block 311 of FIG. 3. By segmenting the web content into snippets corresponding to a route or a POI the relevant portions of the web content can be provided in response to a query, as discussed herein. Segmentation may use a segmentation model that receives the textual content and web page structure as input. For media content, the segmentation model may receive the media content and the text-based record of the media content. The segmentation model may be some form of sequence to sequence model capable of processing outputs of variable lengths. For instance, the segmentation model may be a Long Short Term Memory (LSTM) or Transformer model. The output of the segmentation model may be a delimited version of the inputted textual content and/or media content, with each portion of the output being a snippet. For web pages, the underlying Hypertext Markup Language (HTML) or Document Object Model (DOM) may be used to determine where to segment content. Use of snippets in this way means that only relevant content need be processed in the future when a user wishes to access the content. Hence, processing at the user device is reduced. The bandwidth required to send such snippets to the user is also minimized.

Each snippet may be assigned a label indicating it corresponds to either a POI or a route—including segments of routes—based on the annotations corresponding to the textual content within the snippet. For instance, POIs extracted from the web content may be matched with POIs relevant for a route. Individual route labels corresponding to the snippet may be determined by identifying in the content points in the route. For example, textual content may include "[ . . . ] after the boat reaches Statue of Liberty [ . . . ] you continue in the direction of Coney Island until you reach Steeplechase Pier after which [ . . . ]." The points of interest, including the Statue of Liberty, Coney Island, and Steeplechase Pier may all be POIs relevant for a route. Based on the additional text in the web content, it can be determined that the POIs are for directions, and each instance of a POI or pair of POIs may be a portion of the route and be labeled as such. Labelling the snippets improves the efficiency of identification of relevant content in the future, which can improve speed and reduce processing.

In another example, media content input into the segmentation model may include a video of a walking tour that verbally describes famous landmarks. The segmentation model may receive the media content and a text-based record of the media content as inputs. The segmentation model may then, based on the inputs, segment the media content into snippets. The snippets may each correspond to one or more of the landmarks in the media content. If a snippet does not relate to a route or POI then no label is assigned to the snippet and it is not processed further.

Figure 5:
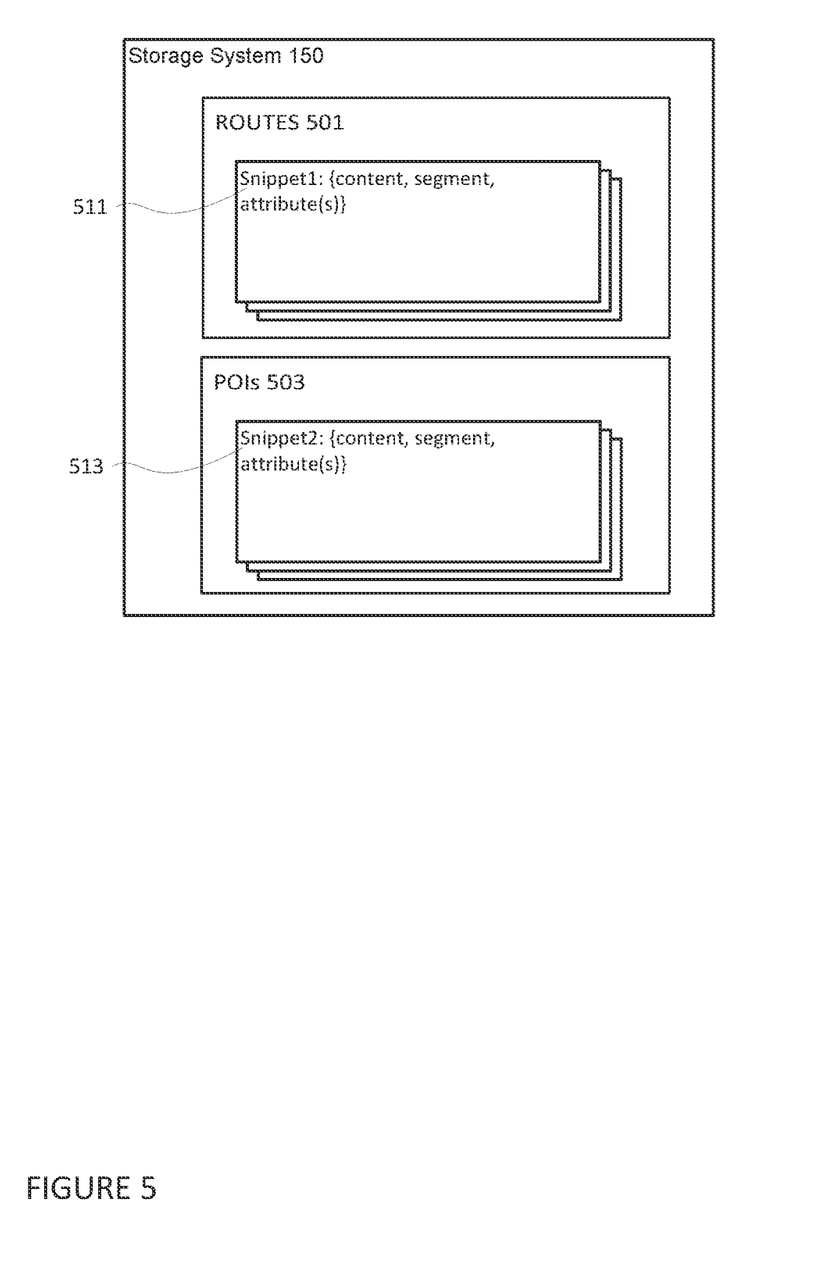
FIG. 5 is an example of a database in accordance with aspects of the disclosure.

Each snippet may be indexed in an inverse index database according to whether it corresponds to a route or a POI, as shown in block 313 of FIG. 3. In this regard, and as shown in FIG. 5, each snippet may be indexed in its own entry. For example, Snippet1 511, which has been determined to be directed to a route, may be indexed into an inverse index database that stores indexed entries corresponding to routes 501. In another example, Snippet2 513, which has been determined to be directed to a POI, may be indexed into an inverse index database that stores indexed entries corresponding to POIs 503. Although the inverse index databases 501 and 503 are shown as being separate, they may be stored in the same database. Moreover, there may be many inverse index databases. The inverse index databases may be stored in a storage system, such as storage system 150, or in internal memory of a server, such as server 110.

Each indexed entry may be stored in associated with data that indicates the content from where the snippet was determined, the segment of the web content that the snippet corresponds to, as well as additional data, such as attributes and metadata. The inverse index database may also store the web content or a link to the web content. Although Snippet1 511 in routes 501 and Snippet2 in POIs 503 are shown as including content, segment, and attributes, indexed entries may include any other data described herein. In some instances, the inverted index can store multiple entries for a single key. For example, multiple snippets may be stored for a single POI or route.

Metadata may include information identifying the relevant fragment in the web content. For instance, "route segment (A, B)→('web.html', word index start 10, word index end 100))' or ('media.mp3', start second 10, end second 15)".

The attributes can include data corresponding to the context of the snippet, such as in what travel context is the content most relevant. For instance, the attributes may include "tourist," "commuter," "business trip," "school run," etc. The attributes can be provided by the annotations from the entity annotation models or the classifications provided by document-level classification models. In some embodiments the attributes may be based on source mappings, such as web-page or website level mappings. For instance, web content from certain sources or web pages may have predefined attributes or may be limited to a set of attributes. In some embodiments the attributes may be provided in the webpage or website metadata.

The indexed entries may be ranked, as shown in block 315 of FIG. 3. In this regard, a score may be assigned to some or all combinations of an indexed entry and an attribute. For instance, an indexed entry having multiple travel contexts associated with it may be assigned a score for each individual travel context. These scores can be stored in association with the respective index entries.

The precomputed index may be queried to determine whether indexed entries could be relevant to a user of the map application based on the user's current session or query provided by the user. This determination for relevant web content may be done by searching the indexed entries to determine whether any snippets corresponding to the indexed entries are relevant to the user's context and/or an explicit query received from the user. A user's context may be determined from the user's location history, search history, browsing history, etc. For instance, if the user is visiting locations they have not previously visited, and the locations are known tourist destinations, the user's context may be vacation. In this regard, a user's context may be considered a user query. The map application may include options to disable and/or enable the sharing of the user's context data. As the indexed entries may be separated into POIs and routes, the search for relevant snippets may be limited to POIs, routes, or segments of routes based on the user's context and query. By doing such, the amount of indexed entries that are searched may be reduced.

For example, when it is known a user of the map application is on vacation, which may be determined through search queries, location data, etc., the indexed data may be searched to determine if there are indexed entries relevant for locations being visited by the user and which are related to vacations. The snippet or snippets associated with the highest ranking indexed entries may be selected and provided to the user. The snippet or snippets may include the corresponding web content or the map application may retrieve the web content based on the link provided in the snippet or snippets. In another example, a user on their commute may be provided with snippets that show tips from other commuters who make a similar commute. In yet another example, a user browsing a place on street view which they've never visited before can be offered snippets that provide "virtual tours" and/or snippets that provide supplementary information about the place being viewed.

The snippets may be formatted such that the content of the snippets are displayed inline to the user. In this regard, the snippets may be formatted to appear as if they are from the same source as other data provided by the map application. A citation to the underlying website or URL where the snippet was derived may also be displayed. The citation may provide information indicating where the snippet comes from and that the snippet is from an external source. In some instances, the citation may include a link to the external source or a direct link to the web content from where the snippet comes from. The formatting of the snippets on the display may be varied based on the map application interface. In one example, when the map application is in turn-by-turn navigation mode, the relevant snippets are spoken when a user is approaching a POI on their trip. These snippets can be spoken in a different voice or with a prefix to indicate that they come from an external source. The map application may include options to enable or disable the incorporation of web content into the map application.

Although the foregoing examples describe integrating snippets into a map application, the snippets may be integrated into other applications such as search results or virtual assistants.

Example Use Cases

Directions: A user may enter a destination into a map application on a user device, such as computing device 120. For instance, the user may enter "theme park, Hollywood". In response to the destination entry, the map application may provide a set of possible routes to the theme park in Hollywood. The routes may be computed as they typically would be, such as by using locally stored mapping data in the computing device 120 to determine routes that have the shortest duration or distance. Alternatively, or in addition, a server, such as server device 110 may also provide determined routes to the map application. Among the determined routes, the server may also present a route that has been indexed in an inverse index database. In this regard, the server may query the inverse index database for routes associated with the theme park and provide the route provided by the theme park to the map application. The map application may present the route provided by the theme park in line with other results, if available. In some instances, the map application may identify that the route is provided and/or recommended by the theme park. For instance, the map application may include an indication such as "Recommended by Theme Park".

Directions and Navigation: A user is on vacation in California and requests from a map application or virtual assistant directions to "navigate to Monterrey on a scenic route". Based on the query, the most relevant snippets that contain navigation instructions for scenic routes to Monterrey may be determined and provided to the user's device. The map application or virtual assistant may provide the snippets as possible routes to take. While a user is in turn-by-turn navigation mode, the map application or assistant can provide audio output of the snippets. For instance, the map application or assistant can convert the textual content to audio and output the textual content to the user. For instance, the map application or assistant can state, "There's a parking 100 m on the left where you can get the best views".

Navigation: A user is on vacation and driving along Route 66 for the first time. Given the known context about the trip, the map application can offer to speak out information from, for example, the "Route 66 Online Travel Guide" as the user passes relevant points of interest. This can surfaced by the map application asking, for example, "Looks like Online Travel Guide has a few relevant tips along the route, should I provide you with them when appropriate?" As the user is driving, they receive standard navigation instructions to help them reach their destination, along with supplementary information parsed from the travel guide site.

Street view: A user is browsing London on Street View. As the user moves along Marylebone high street, they may be provided with an offer to watch (or listen to) a relevant portion of the "Marylebone Walking Tour" video on YouTube, to get some historical information about Marylebone. As the user continues to move around and passes 221B Baker Street. They are now offered to listen to a different portion of the same video to learn more about the story of Sherlock Holmes.

Ad opportunities: Bloggers, or others, such as travel agencies, may want to advertise their profiles, businesses or web-pages in relation with a particular navigation route. In this regard, the technology described herein would allow content that are not POIs or other maps-specific content to be surfaced. For instance, ads may be associated with indexed entries. When indexed entries associated with an ad is provided in response to a query, the ad may also be provided.

The technology described herein is advantageous because it provides map applications with the ability to source and provide users with relevant web content. Moreover, by indexing the web content, the technology provides for the efficient retrieval of web content without needing to process web content in full in response to each user query. The use of snippets and other forms of content reduction presented also reduce the bandwidth required to transmit the content to a user device. Furthermore, the storage requirements at the user device are also reduced.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for integrating web content into a map application, comprising:
receiving, by one or more processors, in response to a query for directions to a location, directions to the location and at least one snippet of web content identified as relevant to the query, the at least one snippet of content including textual content from a source on the web, wherein the textual content includes information about a route and/or points of interest near the route;
formatting, by the one or more processors, the at least one snippet of content for display in the map application, wherein formatting the at least one snippet of content comprises altering a format of the at least one snippet of content such that the altered format of the at least one snippet of content is visually consistent with other data displayed by the map application; and
outputting, by the one or more processors, the at least one snippet of content for display in the map application.

2. The method of claim 1, further comprising:
converting the textual content to audio content; and
outputting the audio content.

3. The method of claim 2, further comprising:
prior to converting the textual content to audio content, outputting a query to a user of the map application, the query requesting confirmation the user wants to receive the audio content; and
converting the portion of textual content to the audio content after receiving confirmation the user wants to receive the audio content.

4. The method of claim 1, wherein formatting the at least one snippet of content for display in the map application includes formatting the at least one snippet of content based on an interface mode of the map application.

5. The method of claim 1, wherein the at least one snippet of content further comprises media content, the media content including audio and/or video content, wherein outputting the at least one snippet of content further comprises outputting the media content.

6. The method of claim 1, wherein the source on the web is a third-party website, and outputting the at least one snippet of content further comprises outputting a citation comprising a link to the third-party website.

7. The method of claim 1, wherein outputting the at least one snippet of content further comprises:
outputting the at least one snippet of content when a user of the map application approaches, arrives, and/or passes a particular location on the route and/or one or more of the points of interest near the route.

8. A system, comprising:
one or more processors configured to:
receive, in response to a query for directions to a location, directions to the location and at least one snippet of web content identified as relevant to the query, the at least one snippet of content including textual content from a source on the web, wherein the textual content includes information about a route and/or points of interest near the route;
format the at least one snippet of content for display in the map application, wherein formatting the at least one snippet of content comprises altering a format of the at least one snippet of content such that the altered format of the at least one snippet of content is visually consistent with other data displayed by the map application; and
output the at least one snippet of content for display in the map application.

9. The system of claim 8, wherein the one or more processors are further configured to:
convert the textual content to audio content; and
output the audio content.

10. The system of claim 9, wherein the one or more processors are further configured to:
prior to converting the textual content to audio content, output a query to a user of the map application, the query requesting confirmation the user wants to receive the audio content; and
convert the portion of textual content to the audio content after receiving confirmation the user wants to receive the audio content.

11. The system of claim 8, wherein formatting the at least one snippet of content for display in the map application includes formatting the at least one snippet of content based on an interface mode of the map application.

12. The system of claim 8, wherein the at least one snippet of content further comprises media content, the media content including audio and/or video content, wherein outputting the at least one snippet of content further comprises outputting the media content.

13. The system of claim 8, wherein the source on the web is a third-party website, and outputting the at least one snippet of content further comprises outputting a citation comprising a link to the third-party website.

14. The system of claim 8, wherein outputting the at least one snippet of content further comprises:
outputting the at least one snippet of content when a user of the map application approaches, arrives, and/or passes a particular location on the route and/or one or more of the points of interest near the route.

15. A non-transitory computer-readable storage medium storing instructions executable by one or more processors for performing a method, comprising:
receiving, in response to a query for directions to a location, directions to the location and at least one snippet of web content identified as relevant to the query, the at least one snippet of content including textual content from a source on the web, wherein the textual content includes information about a route and/or points of interest near the route;
formatting the at least one snippet of content for display in the map application, wherein formatting the at least one snippet of content comprises altering a format of the at least one snippet of content such that the altered format of the at least one snippet of content is visually consistent with other data displayed by the map application; and
outputting the at least one snippet of content for display in the map application.

16. The non-transitory computer-readable storage medium of claim 15, wherein the one or more processors are further configured to:
convert the textual content to audio content; and
output the audio content.

17. The non-transitory computer-readable storage medium of claim 16, wherein the one or more processors are further configured to:
prior to converting the textual content to audio content, output a query to a user of the map application, the query requesting confirmation the user wants to receive the audio content; and
convert the portion of textual content to the audio content after receiving confirmation the user wants to receive the audio content.

18. The non-transitory computer-readable storage medium of claim 15, wherein the source on the web is a third-party website, and outputting the at least one snippet of content further comprises outputting a citation comprising a link to the third-party website.

19. The non-transitory computer-readable storage medium of claim 15, wherein the at least one snippet of content further comprises media content, the media content including audio and/or video content, wherein outputting the at least one snippet of content further comprises outputting the media content.

20. The non-transitory computer-readable storage medium of claim 15, wherein outputting the at least one snippet of content further comprises:
outputting the at least one snippet of content when a user of the map application approaches, arrives, and/or passes a particular location on the route and/or one or more of the points of interest near the route.

* * * * *